(12) United States Patent
Quam et al.

(10) Patent No.: US 8,215,246 B2
(45) Date of Patent: Jul. 10, 2012

(54) PORTABLE STAGING AND LEG BRACKET THEREFOR

(75) Inventors: Grant S. Quam, Owatonna, MN (US); Martin E. Thiede, Owatonna, MN (US)

(73) Assignee: Wenger Corporation, Owatonna, MN (US)

( * ) Notice: Subject to any disclaimer, the term of this patent is extended or adjusted under 35 U.S.C. 154(b) by 761 days.

(21) Appl. No.: 12/325,857

(22) Filed: Dec. 1, 2008

(65) Prior Publication Data
US 2009/0139151 A1    Jun. 4, 2009

Related U.S. Application Data

(60) Provisional application No. 60/991,069, filed on Nov. 29, 2007.

(51) Int. Cl.
*A47B 13/02* (2006.01)
(52) U.S. Cl. ............... 108/156; 108/158.11; 108/159.11
(58) Field of Classification Search ................... 108/156, 108/155, 159, 159.11, 158, 158.11, 158.13, 108/186, 187, 192, 147.12–147.14, 147.17, 108/157.15; 52/7; 248/188, 188.1, 220.1, 248/231.31, 163.1, 188.8, 677; 403/170–172, 403/205, 217, 231, DIG. 12–13
See application file for complete search history.

(56) References Cited

U.S. PATENT DOCUMENTS

| | | |
|---|---|---|
| 2,954,638 A * | 10/1960 | Motter .......................... 403/319 |
| 3,747,540 A | 7/1973 | Salkoff et al. |
| 3,851,600 A | 12/1974 | Kohl |
| 3,874,511 A | 4/1975 | Maskow |
| 3,915,101 A | 10/1975 | Onori |
| 3,927,769 A | 12/1975 | Maslow |
| 3,964,404 A | 6/1976 | Mueller et al. |
| 3,979,098 A | 9/1976 | Vattier |
| 3,981,250 A | 9/1976 | Anthony |
| 4,132,178 A | 1/1979 | Mueller et al. |
| 4,237,798 A | 12/1980 | Welsch et al. |
| 4,257,333 A | 3/1981 | Pollack |
| 4,343,135 A | 8/1982 | Ilich |
| 4,488,698 A | 12/1984 | Delafield |
| 4,580,776 A | 4/1986 | Burkinshaw |
| 4,671,872 A | 6/1987 | Cramer et al. |
| 4,846,079 A * | 7/1989 | Ajax ............................ 108/156 |
| 5,002,247 A | 3/1991 | Dispenza et al. |
| D338,792 S | 8/1993 | Chap et al. |
| 5,319,906 A * | 6/1994 | Hayden ........................ 52/127.6 |
| 5,588,370 A | 12/1996 | Longley |
| 6,017,009 A | 1/2000 | Swartz et al. |
| 6,161,262 A | 12/2000 | Pfister |
| 6,431,794 B1 | 8/2002 | Zweber |
| 6,592,088 B2 | 7/2003 | Thompson |
| 6,848,659 B1 | 2/2005 | Liu |
| 7,021,590 B2 | 4/2006 | Hoffmann |
| 2004/0211137 A1 | 10/2004 | Thiede |

* cited by examiner

*Primary Examiner* — Janet M Wilkens
(74) *Attorney, Agent, or Firm* — Patterson Thuente Christensen Pedersen, P.A.

(57) ABSTRACT

A portable staging system adjustable for quick assembly and disassembly and inherent sturdiness. The portable staging system includes a bracket assembly for detachably coupling a support member to the platform of the portable stage. The bracket assembly includes a bracket sleeve adapted to receive the support member, a brace member shiftable within the bracket sleeve between a support member engaging position and a support member clearing position, and an actuator assembly for simultaneously shift first and second drivers of the brace member.

27 Claims, 16 Drawing Sheets

PORTABLE STAGING AND LEG BRACKET THEREFOR

RELATED APPLICATIONS

The present application claims the benefit of U.S. Provisional Application No. 60/991,069 filed Dec. 29, 2007, which is incorporated herein in its entirety by reference.

FIELD OF THE INVENTION

The present disclosure relates generally to staging. More particularly, the present disclosure relates to a collapsible staging system designed for sturdiness and ease of assembly and disassembly. Bracket assemblies for securely attaching and detaching support members to platform decking of portable staging are disclosed.

BACKGROUND OF THE INVENTION

In the performing arts, it is often desirable to provide an elevated performance surface. The elevated surface can provide enhanced viewing of the performers and can improve the acoustics of the performance. For example, theatrical performances and musical concerts are often performed on a stage elevated above at least a portion of the audience.

There is often a need for such elevated surfaces to be collapsible. For example, the performance may occur at a location, such as an auditorium, a gymnasium, or a dining area, that are used for multiple purposes. As a result, the staging equipment cannot remain assembled, either permanently or otherwise, for an extended period of time. In addition, it may be necessary for the performers to provide and assemble their own staging equipment since the location may not have proper equipment for creating an elevated performance surface. To make room for not have proper equipment for creating an elevated performance surface. To make room for subsequent events at the various locations and reduce delays, it is beneficial if the staging system is relatively easy and fast to assemble and disassemble.

To facilitate assembly and disassembly, collapsible staging equipment can be constructed so that the support members, or legs are collapsible or detachable from the platform. In this manner, the staging equipment can be configured to occupy less volume and easier for handling. Various types of leg joints are known that permit the respective support members to be moved relative to the supported surface. For example, U.S. Pat. No. 3,747,540 discloses a corner clamp with a U-shaped strap that extends around the support member and can be tightened against a shelving surface by a lock bolt. U.S. Pat. No. 4,580,776 discloses a collapsible stage in which the support members are coupled to the platform through a combination of hinges and gusset plates. A drawback of staging equipment that utilize leg joints for disassembling or collapsing support members, however, is that they may not be as sturdy or durable as staging equipment having permanently attached support members.

During performances, staging equipment must often support significant loads. These loads may include the weight of the performers, instruments, stage props, scenery, and other items. The combined weight of these factors can stress the staging equipment, particularly the joints where the legs are coupled to the stage platform. Movement of the performers on the platform surface can further add to the stress experienced by the staging equipment at the leg-deck joints. Over time, the combined effect of these loads and stresses can compromise the fit of leg on the platform and the overall performance of the staging equipment. Therefore, there is a need for an improved staging platform that can be used to create temporary structures, including multilevel stages, runways, graduation stages, speaker platforms, and the like, at events such as musical performances, weddings, fashion shows, and the like. In particular, the staging should be portable such that it can be taken out of storage or moved from one location to another, such as a point of use, easily assembled and disassembled, and provide a sturdy elevated surface that resists fatigue over time.

BRIEF SUMMARY OF THE INVENTION

A staging assembly can be easily set up and reconfigured into multilevel stages, runways, graduation stages, speaker platforms, and the like according to various embodiments of the present invention. The staging can include platforms having decking and separate, attachable/detachable support members for the creation of multiple staging configurations.

The staging assembly is configurable through the use of bracket assemblies for detachably coupling support members to a platform. Each bracket assembly can receive a support member, such as a leg for use with staging equipment. The support member can be secured within the bracket assembly by a user for enhanced stability and overall performance of the staging assembly. The support member can later he removed from the bracket assembly by the user to facilitate disassembly and transportation of the staging assembly.

According to an embodiment of the invention, a bracket assembly for detachably coupling a support member to a platform of a portable stage comprises a bracket sleeve, a brace member, and an actuator. The support member presents a support member longitudinal axis. The bracket sleeve presents a bracket sleeve longitudinal axis. The bracket sleeve is adapted to receive the support member such that the support-member longitudinal axis and the bracket sleeve longitudinal axis being are generally aligned. The brace member is shiftably carried by the sleeve and shiftable along a path of travel transverse to the bracket sleeve longitudinal axis between a support member engaging position and a support member clearing position. The brace member includes a support member engaging surface and spaced-apart first and second drivers. The actuator assembly can simultaneously shift the first and second drivers to push the support member engaging surface of the brace member against the support member when the support member is received within the bracket sleeve and the bracket member is in the support member engaging position.

According to further embodiments of the present invention, the bracket sleeve can include an integral structure circumferentially enclosing an area for receiving the support member and the brace member. The integral structure can include first and second flanges adapted to be fastened to the platform. The bracket assembly may further include a gear mechanism for shifting the first and second drivers. The gear mechanism can include first and second driver gears threadably connected to the first and second drivers, respectively, and an actuator coupled to the actuator. The actuator gear may engage the first and second driver gears. The actuator may include a reversibly rotatable knob for shifting the brace between the support member engaging positions and the support member clearing positions. The gear ratio of the first or second driver gear to the actuator gear may be between approximately 1:1 and 3:1, or approximately 15:8. The gear mechanism can create a mechanical advantage. The support member engaging surface of the brace may be adapted to conformingly engage the support member. The support member engaging surface of the brace may include a plurality of spaced-apart cross surfaces. The bracket sleeve may be fixedly coupled to the platform. A distal end of the actuator may include a faceted surface adapted to conformingly receive a retainer. The retainer may substantially resist decoupling of the actuator and the brace member. The brace member may include a support member stop for limiting travel of the support member within the bracket sleeve along the bracket sleeve longitudinal axis.

According to another embodiment of the prevent invention, a method of assembling a portable stage having a bracket assembly that is coupled to a platform and adapted to receive a support member presenting a support member longitudinal axis along a bracket sleeve longitudinal axis of the bracket assembly includes positioning a brace member into a support member clearing position. The brace member has a support member engaging surface and spaced-apart first and second drivers. The method also includes inserting a proximal portion of the support member into a bracket sleeve. The method further includes substantially aligning the bracket assembly longitudinal axis and the support member longitudinal axis. The method additionally includes simultaneously shifting the first and second drivers. The method also includes positioning the brace member into a support member engaging positing by pushing the support member engaging surface of the brace member against the support member.

According to further embodiments, the brace member may be positioned into the support member clearing position by retracting the support member engaging surface from the support member and the support member may be removed from the bracket sleeve. An actuator assembly may be operated to rotatably engage a gear mechanism. The gear mechanism may include first and second gears. The first gear may be threadably coupled to the first driver and the second gear may be threadably coupled to the second driver. A mechanical advantage may be utilized to position the brace member transverse to the bracket sleeve longitudinal axis. Travel of the support member within the bracket sleeve along the bracket sleeve longitudinal axis may be limited.

According to yet another embodiment of the present invention, a bracket assembly for detachably coupling a support member to a platform of a portable stage comprises a bracket sleeve, a brace member, and a means for simultaneously shifting the first and second drivers. The support member presents a support member longitudinal axis. The bracket sleeve presents a bracket sleeve longitudinal axis. The bracket sleeve is adapted to receive the support member such that the support member longitudinal axis and the bracket sleeve longitudinal axis being are generally aligned. The brace member is shiftably carried by the sleeve and shiftable along a path of travel transverse to the bracket sleeve longitudinal axis between a support member engaging position and a support member clearing position. The brace member includes a support member engaging surface and spaced-apart first and second drivers. The means for simultaneously shifting the first and second drivers can push the support member engaging surface of the brace member against the support member when the support member is received within the bracket sleeve and the bracket member is in the support-member engaging position.

BRIEF DESCRIPTION OF THE DRAWINGS

The embodiments of the present invention may be more completely understood in consideration of the following detailed description of various embodiments in connection with the accompanying drawings, in which.

Figure 1:
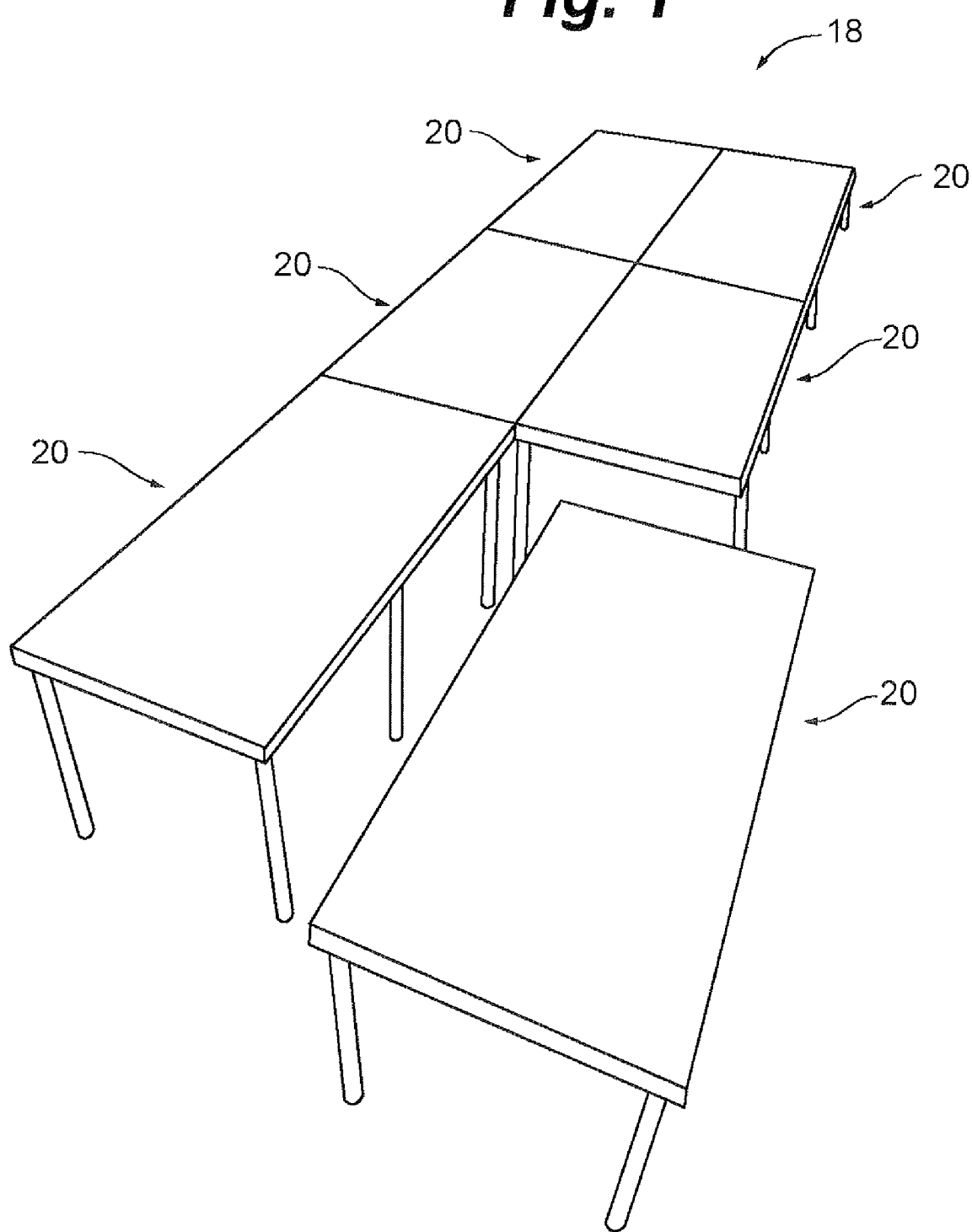
FIG. 1 is a perspective view of staging formed of a plurality of stage sections.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

Certain embodiments of the present invention are directed to apparatus, systems and methods for attaching a support member to a platform such as, for example, for use with staging equipment. Although various embodiments of a bracket assembly are described for assembling and disassembling staging equipment, one skilled in the art will recognize that the bracket assembly could be used to assist in attaching a support member to a platform in any number of applications.

Referring again to FIG. 1, staging assembly 18 may include one or more stage sections 20. Each stage section 20 can be selectively detachably joined, such as with connectors as described in U.S. Pat. No. 5,769,560, entitled "Portable Stage Module Fastening Device," the disclosure of which is incorporated herein by reference in its entirety. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

Figure 2:
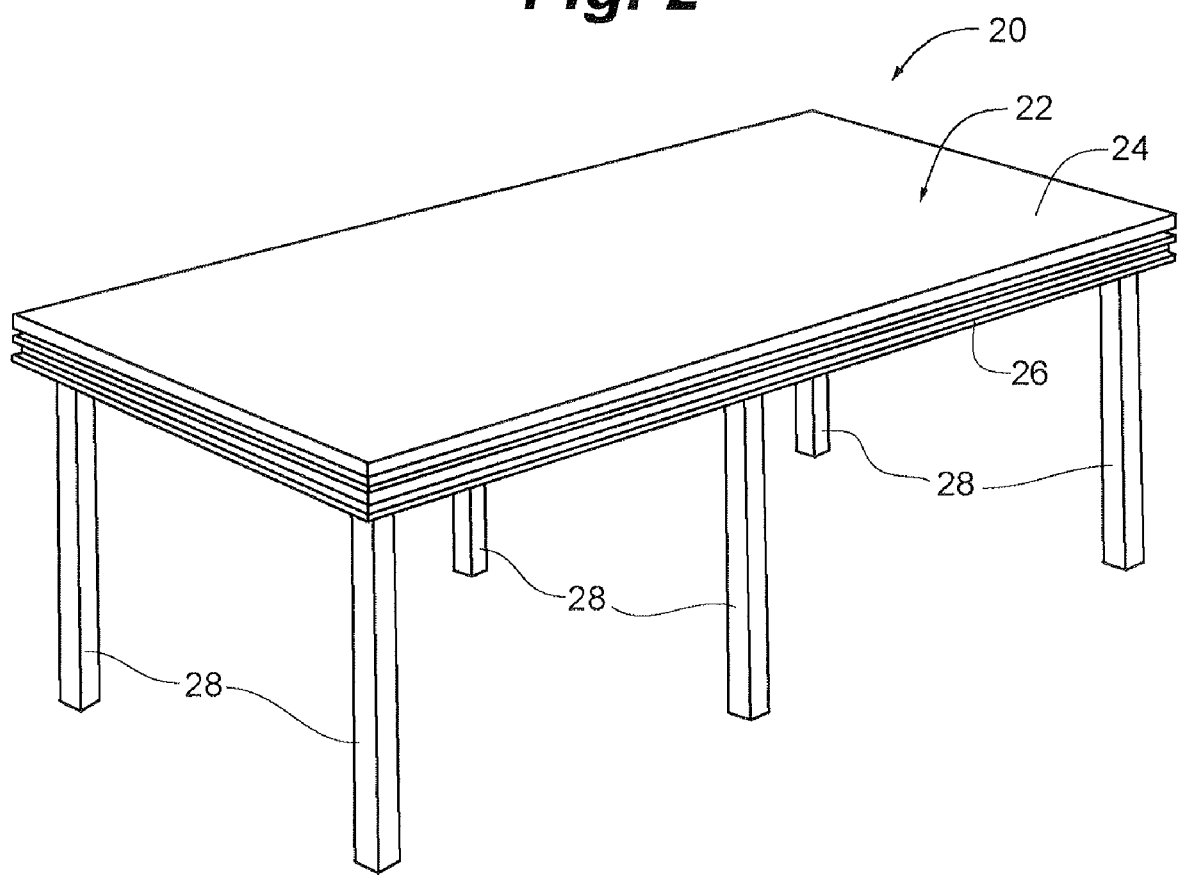
FIG. 2 is a perspective view of a stage section of the plurality of stage sections of the staging of FIG. 1.
Figure 3:
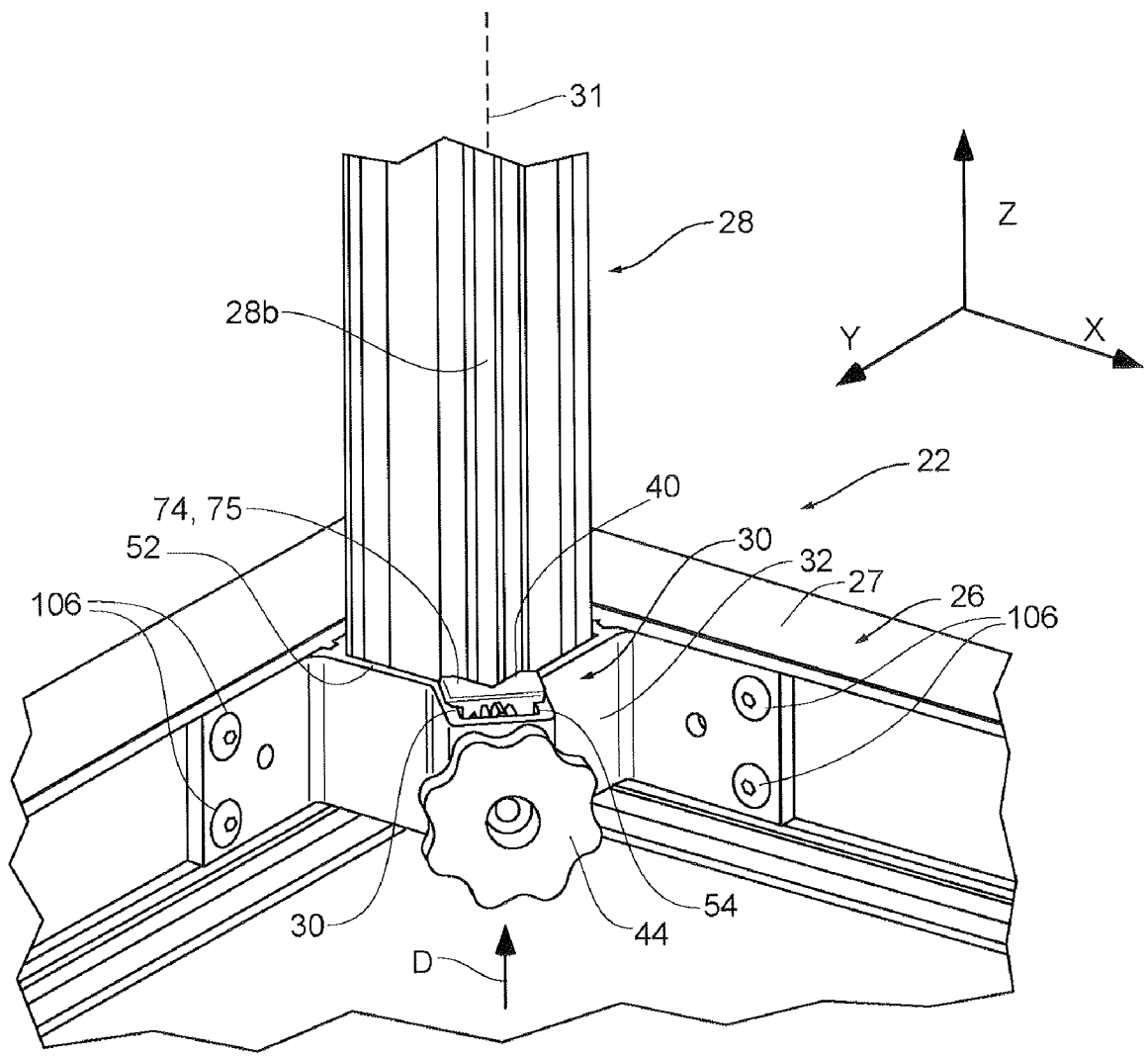
FIG. 3 is a bottom, fragmentary, perspective view of a stage section having a bracket assembly according to a first embodiment on the bottom surface of the stage section of FIG. 2.

Referring to FIG. 2, each stage section 20 generally includes deck portion 22, support member 28, and bracket assembly 30. Although embodiments are depicted wherein each stage section 20 has four bracket assemblies 30, one skilled in the art will recognize that stage section 20 can have any number of bracket assemblies 30 without departing from the spirit or scope of the present invention. Deck portion 22 has top surface 24 and bottom surface 26. Bottom surface 26 may have deck frame 27, as depicted in FIG. 3. Support member 28 present support member longitudinal axis 31, as depicted in FIG. 3. Orientation terms as used herein, such as, for example, "bottom," "top," "under," "over," "lower," and "upper," are generally given relative to component orientations in an assembled, upright platform configuration, but can be used otherwise in given views.

Figure 4:
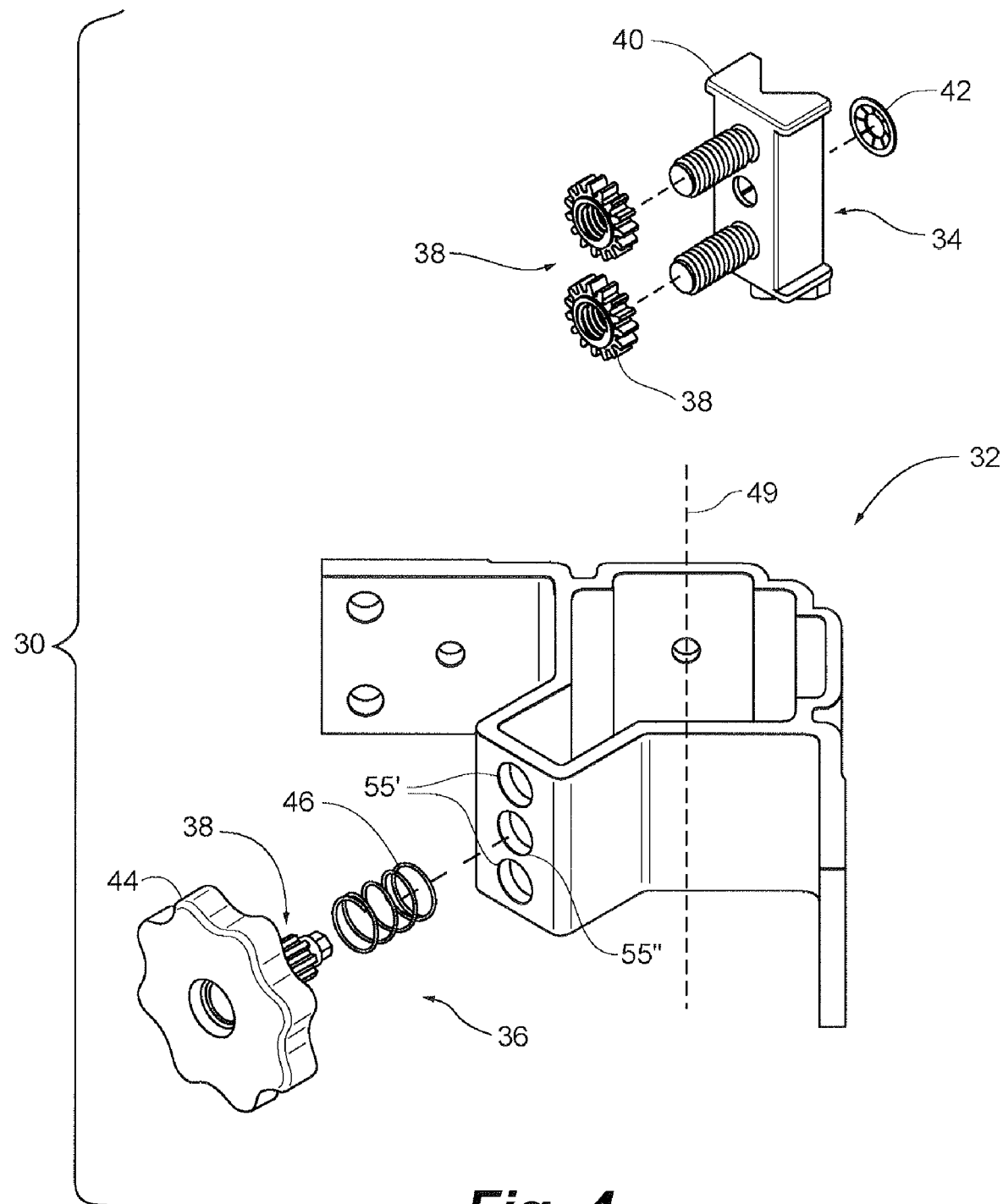
FIG. 4 is an exploded view of the bracket assembly of FIG. 3.

Bracket assembly 30 generally includes bracket sleeve 32, brace member 34, and actuator assembly 36, as depicted in FIG. 4. Bracket assembly 30 generally also includes gear mechanism 38. Bracket assembly 30 may further include retainer 42.

Figure 5:
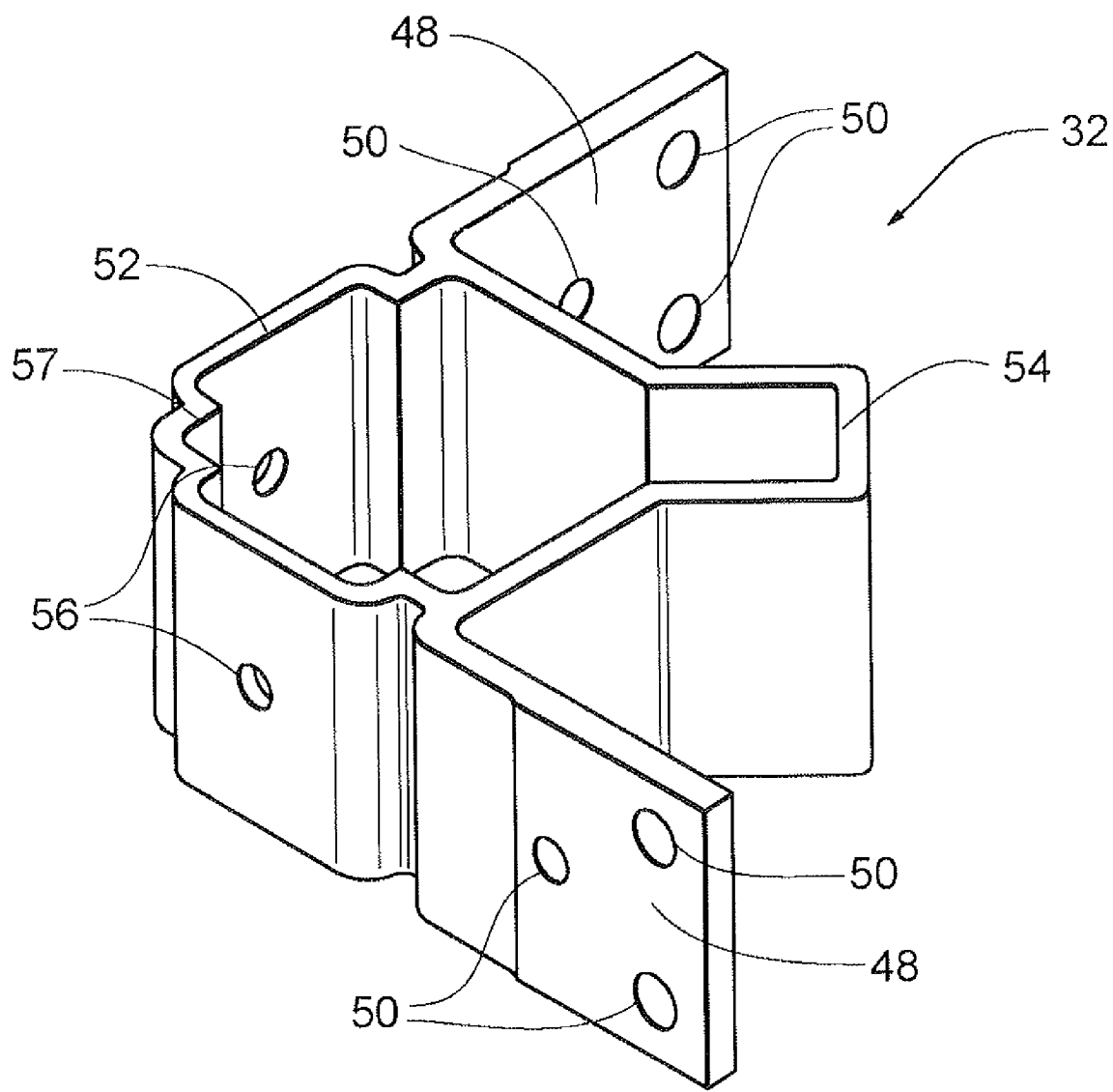
FIG. 5 is a perspective view of a bracket sleeve of the bracket assembly of FIG. 3.

Referring to FIG. 5, bracket sleeve 32 includes main body portion 47. Bracket sleeve 32 may also include one or more flanges 48. Bracket sleeve 32 presents brace sleeve longitudinal axis 49, as depicted in FIG. 4. One skilled in the art will recognize that bracket sleeve 32 may be constructed from any number of materials. According to an embodiment, bracket sleeve 32 is constructed of extruded aluminum alloy 6063-T6.

Figure 13:
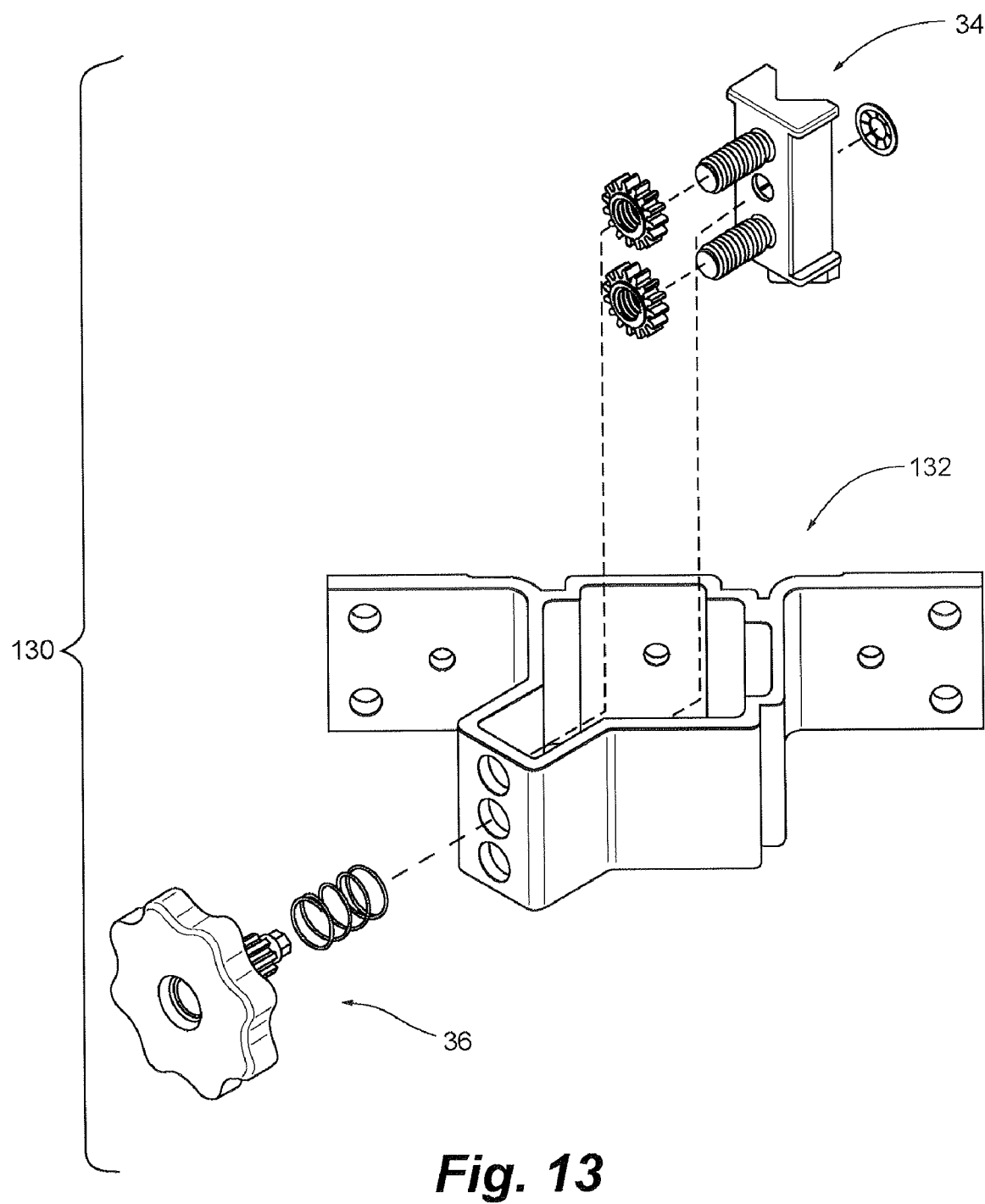
FIG. 13 is an exploded view of a bracket assembly according to a second embodiment.
Figure 14:
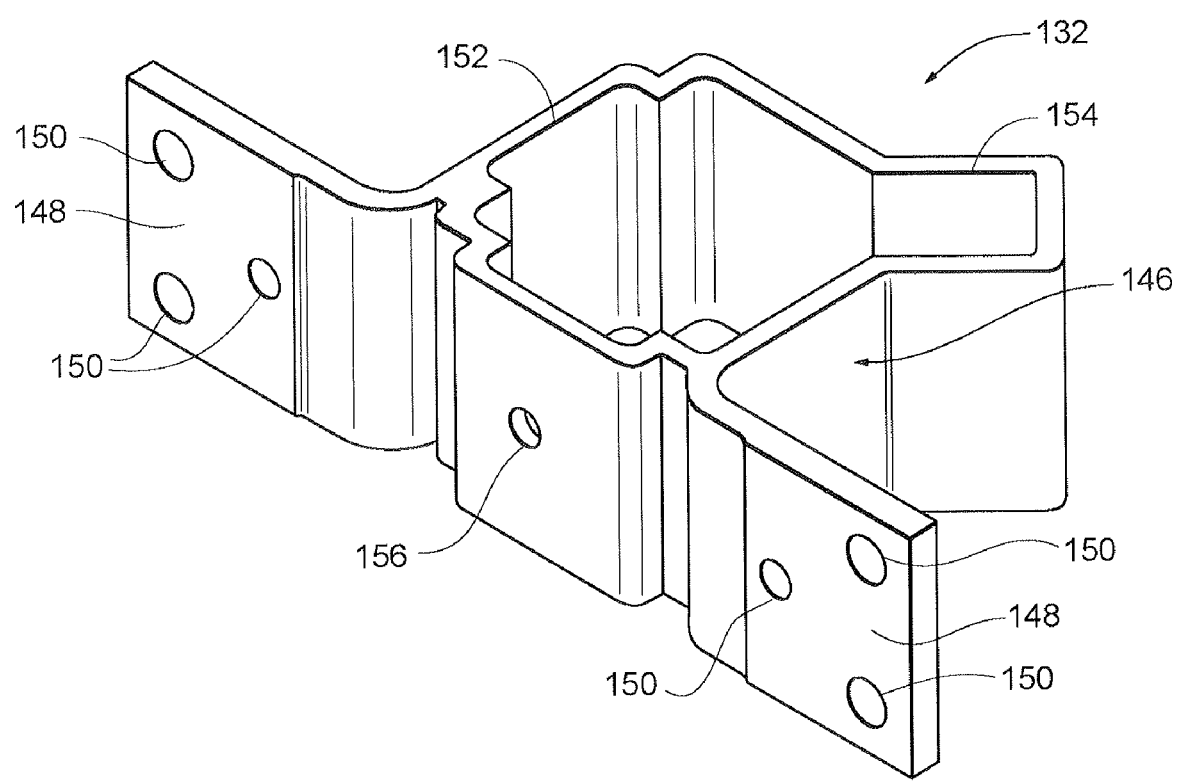
FIG. 14 is a perspective view of a bracket sleeve portion of the bracket assembly of FIG. 13.

Each flange 48 may be presented on bracket sleeve 32 in relation to another flange 48 in any number of orientations. In an embodiment, flanges 48 are presented at approximately a right angle, as depicted in FIG. 5. In another embodiment, flanges 148 are substantially coplanar, as depicted in FIGS. 13 and 14. Flanges 48 may define one or more apertures 50.

Body portion 46 generally includes first channel 52 and second channel 54. Proximate second channel 54, body portion 46 may define apertures 55. Proximate first channel 52, body portion 46 may also define apertures 56. First channel 52 may include sub-channel 57. Sub-channel 57 can be configured to receive a proximal portion of support member 28, such as, for example, a corner of a square-shaped leg.

Figure 6:
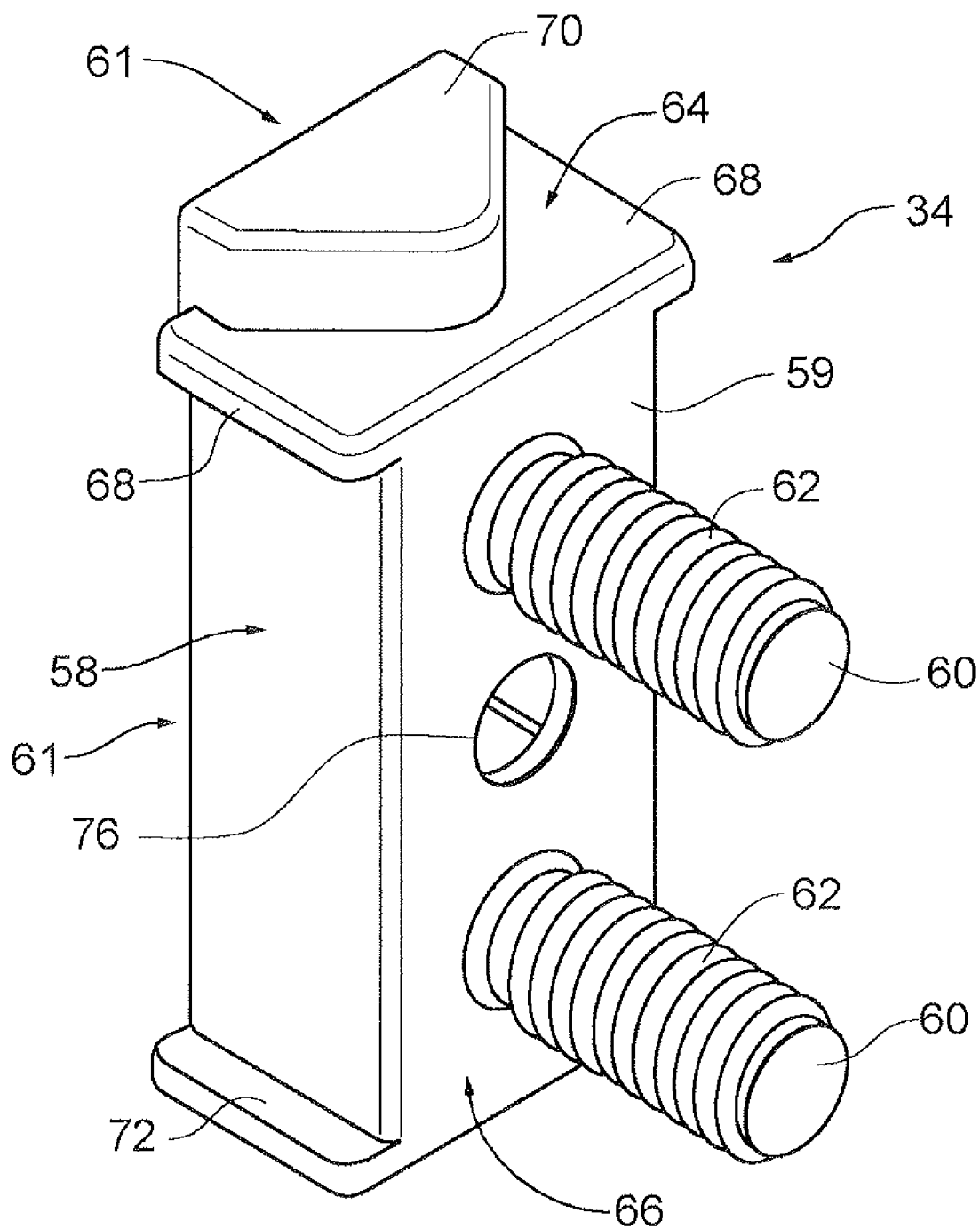
FIG. 6 is a front bottom perspective view of a brace member of the bracket assembly of FIG. 3.
Figure 7:
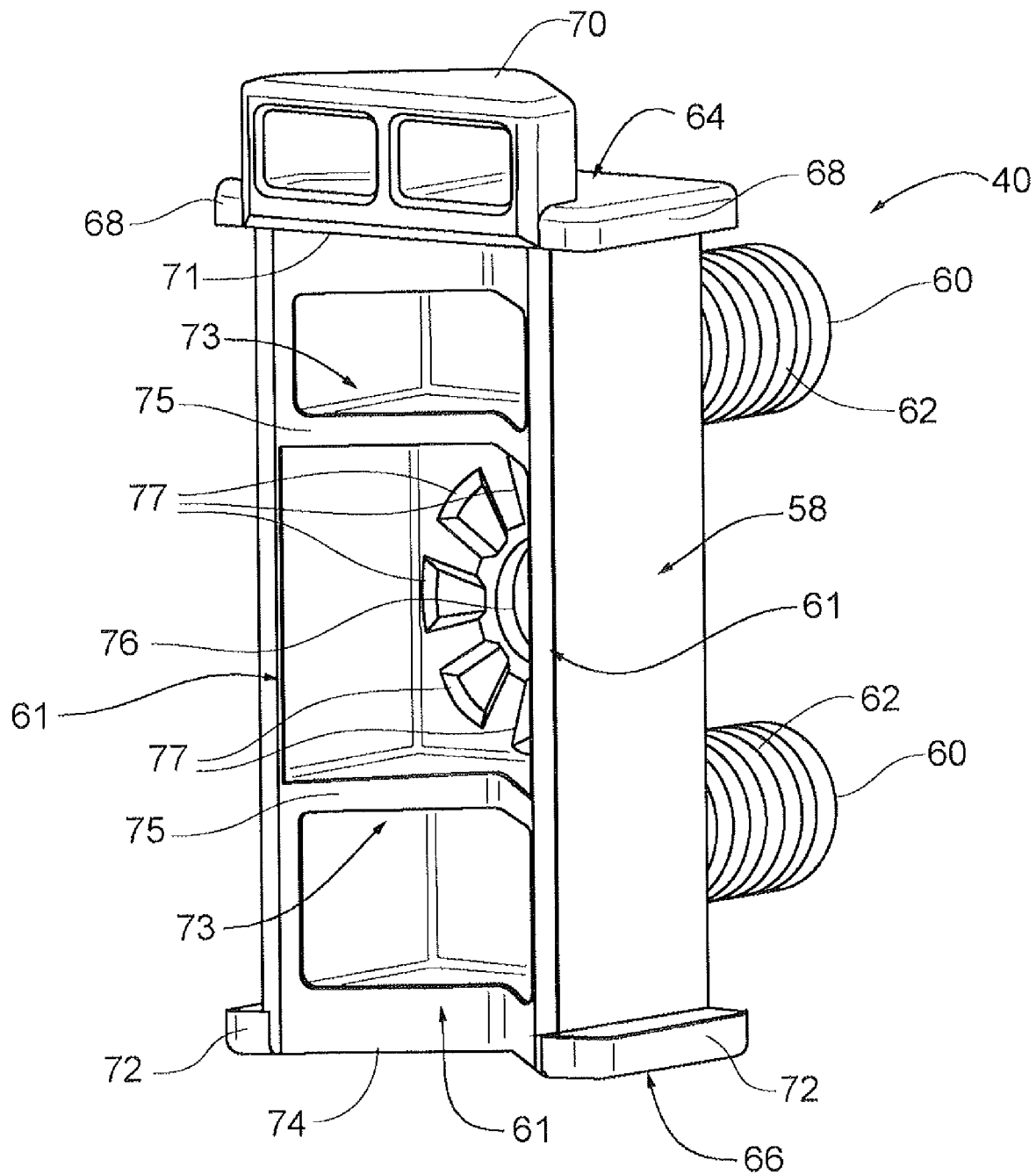
FIG. 7 is a rear perspective view of the brace member of FIG. 6.

Referring to FIGS. 6 and 7, brace member 34 may include a main body portion 58 and drivers 60. Main body portion presents face 59 and support member engaging surface 61. Drivers 60 generally extend from outwardly face 59. Each driver 60 is generally threaded so as to include threads 62. Although the brace member 34 is generally depicted according to embodiments having two drivers 60, brace member 34 may include more than two drivers 60 without departing from the spirit or scope of the present invention.

Main body portion 58 has top end 64 and bottom end 66. Top end 62 may include one or more flanges 68 and corner projection 70 with inside surface 71. Bottom end 64 may include one or more flanges 72 and corner cutout 74, as depicted in FIG. 7. Main body portion 58 may define one or more apertures 76. Main body portion 58 may further include one or more cross members 73 in a rear cavity formed therein. Each of said cross members 73 may define cutout 75 corresponding to cutout 74.

Main body portion 58 may also include a plurality of recesses or grooves 77 presented around a perimeter of aperture 76. One skilled in the art will recognize that brace member 34 may be constructed from any number of materials and using any number of processes. According to an embodiment of the present invention, brace member 34 is constructed of die cast zinc using casting and machining.

Figure 11:
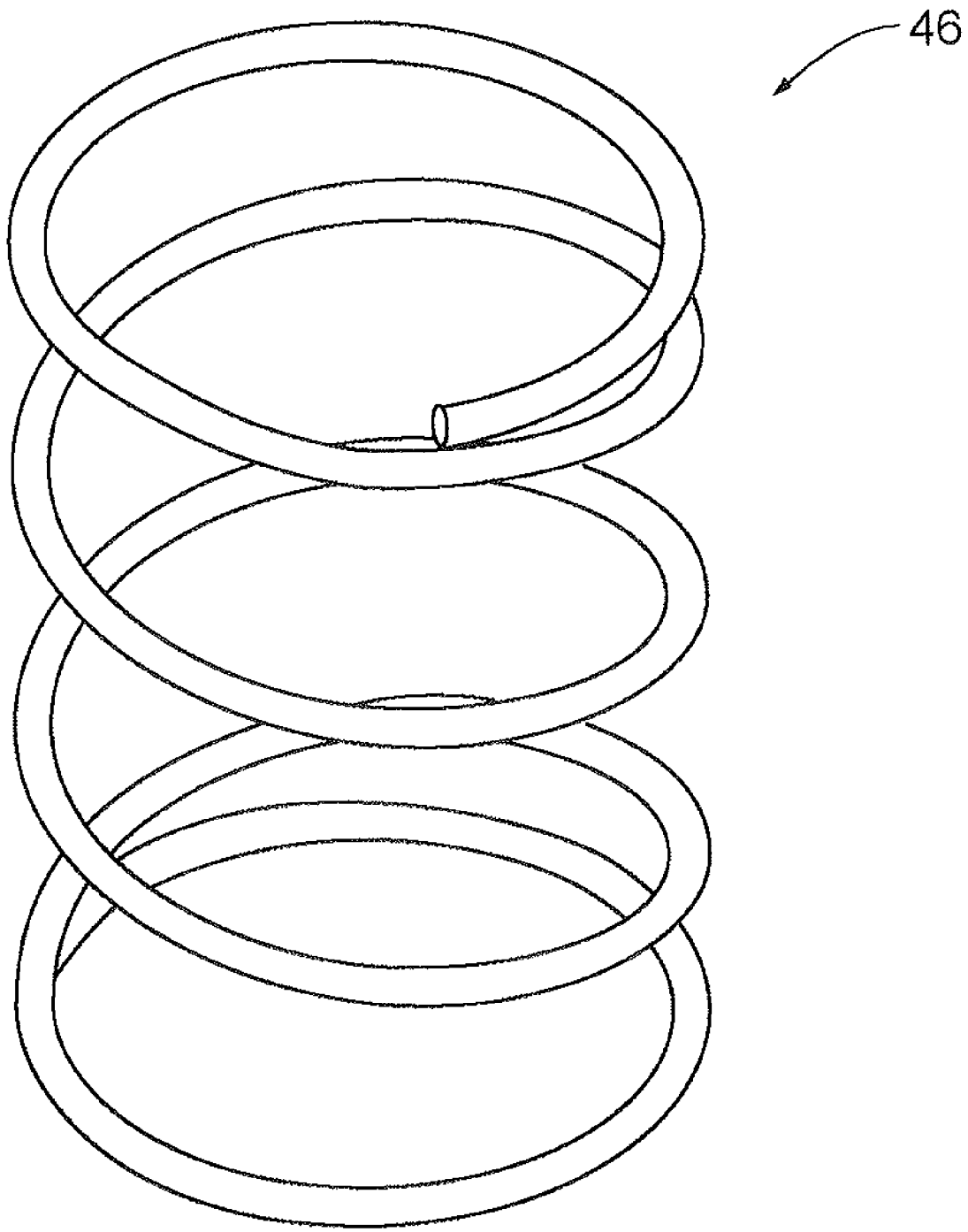
FIG. 11 is a perspective view of a spring of the bracket assembly of FIG. 3.

Actuator assembly 36 generally includes driver actuator 44 and latch spring 46. Latch spring 46, also depicted in FIG. 11, can be constructed of zinc-coated music wire, although those skilled in the art will recognize that other materials can be used.

Figure 8:
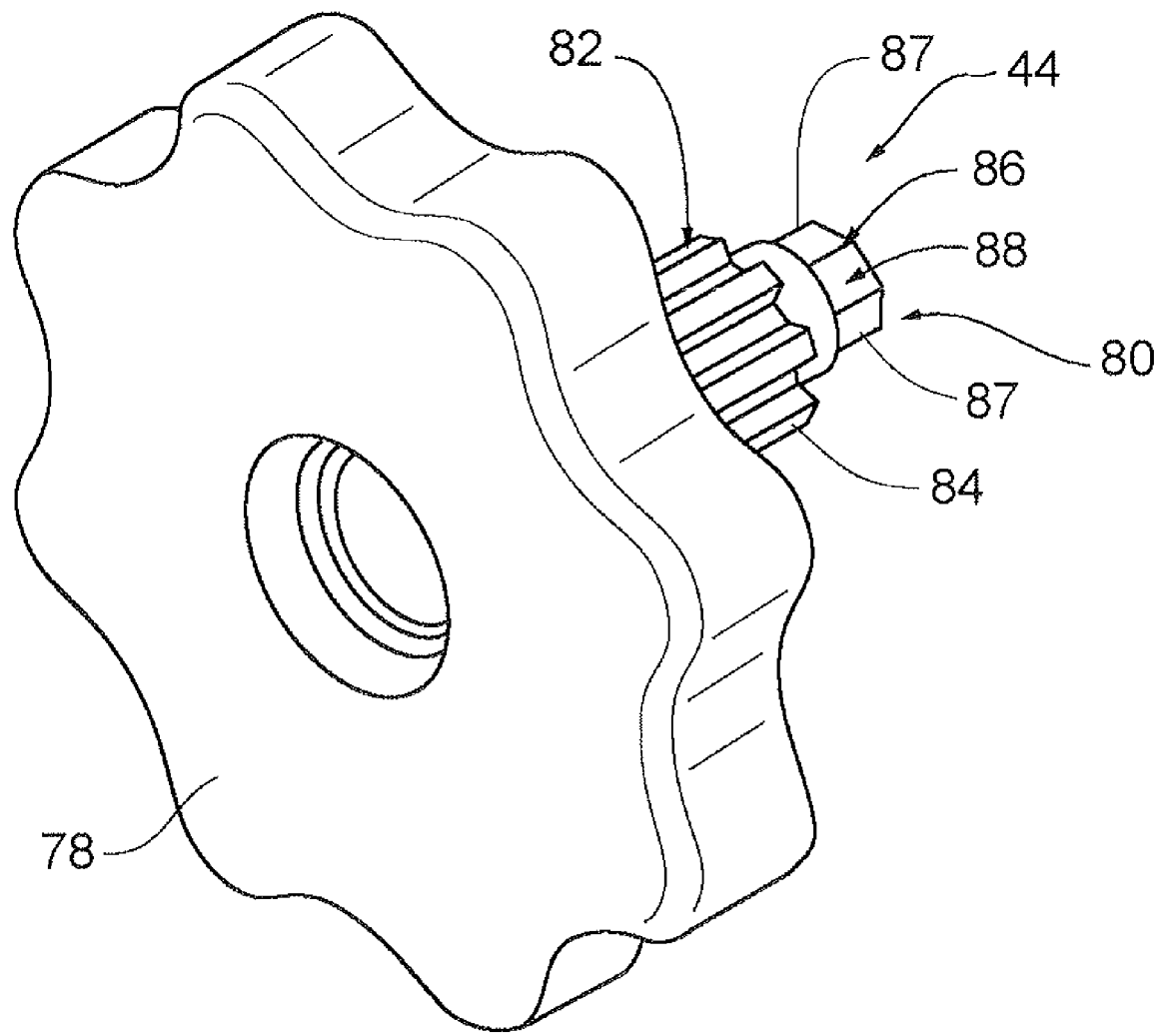
FIG. 8 is a front perspective view of a driver actuator of the bracket assembly of FIG. 3.
Figure 9:
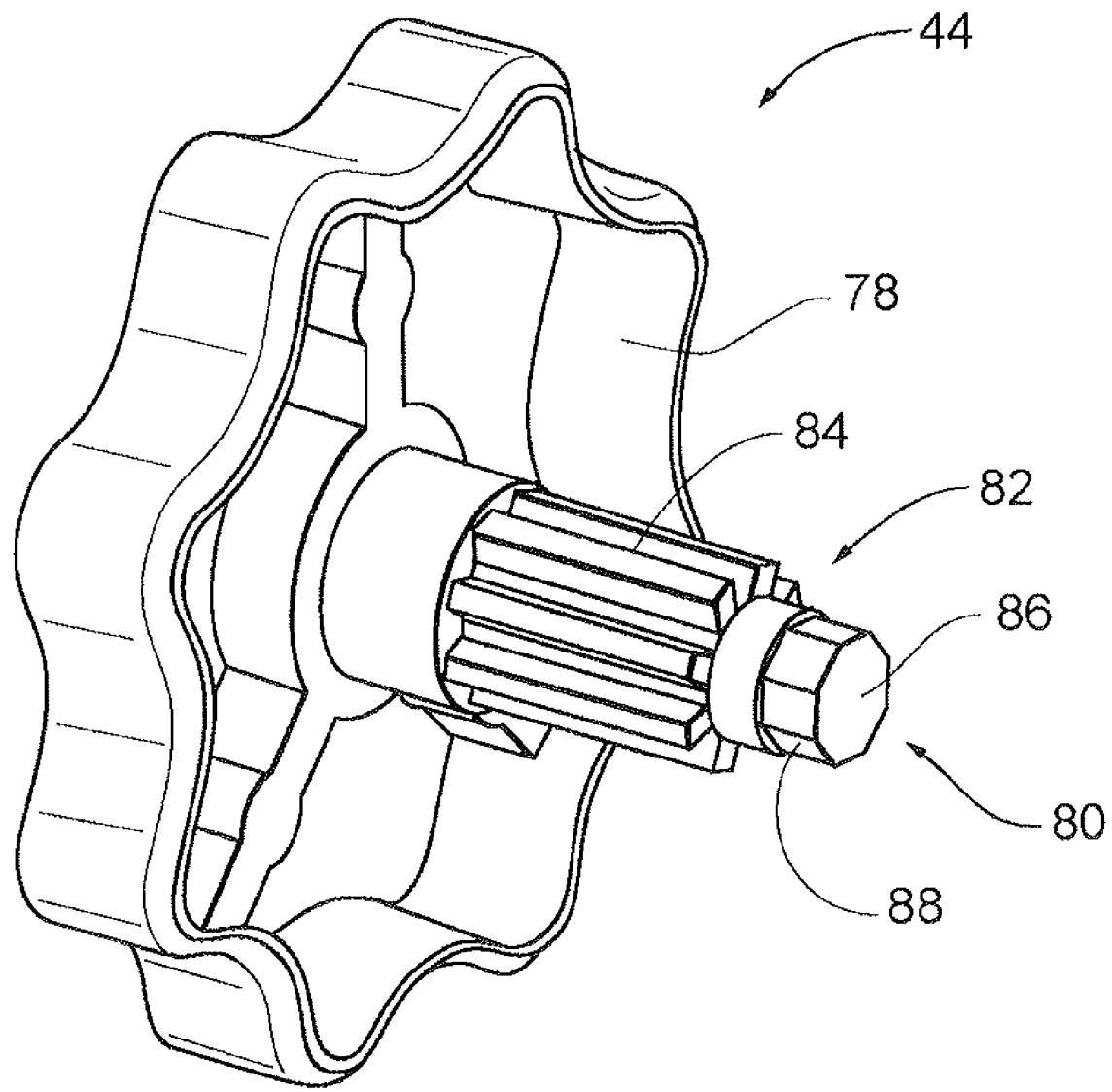
FIG. 9 is a rear perspective view of the driver actuator of FIG. 8.

Referring to FIGS. 8 and 9, driver actuator 44 may include knob portion 78 and post 80 extending from knob portion 78. Post 80 may include pinion portion 82 having pinion teeth 84. Post 80 may also include end portion 86 having faceted surfaces 87. Faceted surfaces 87 generally form geometric FIG. 88, such as, for example, a square-, a pentagon-, a hexagon-, or an octagon-shaped feature. Driver actuator 44 can be constructed of die cast zinc using casting and machining, although one skilled in the art will recognize that other materials and forming processes can be used.

Figure 10:
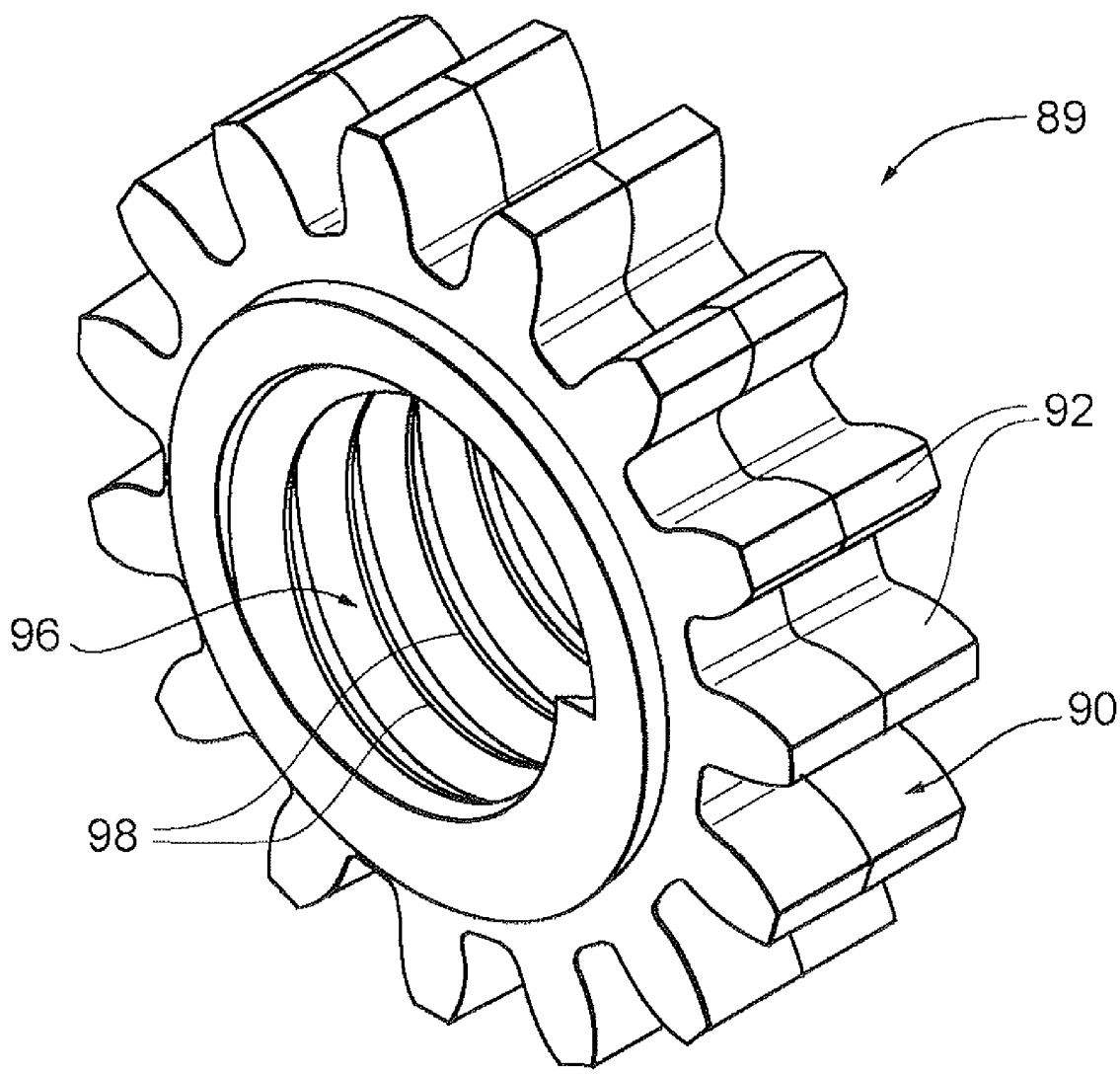
FIG. 10 is a perspective view of a gear of the bracket assembly of FIG. 3.

Gear mechanism 38 generally includes gears 89 and pinion portion 82. Referring to FIG. 10, each gear 90 has gear teeth 92 corresponding to pinion teeth 84. Each gear 89 generally defines aperture 96. Aperture 96 generally corresponds to a substantially central portion of gear 89. Aperture 96 can include threading 98. Threading 98 can correspond to threads 62 of drivers 60 of brace member 34. Gears 89 can be constructed of die cast zinc using casting and machining, although one skilled in the art will recognize that other materials and forming processes can be used.

Figure 12A:
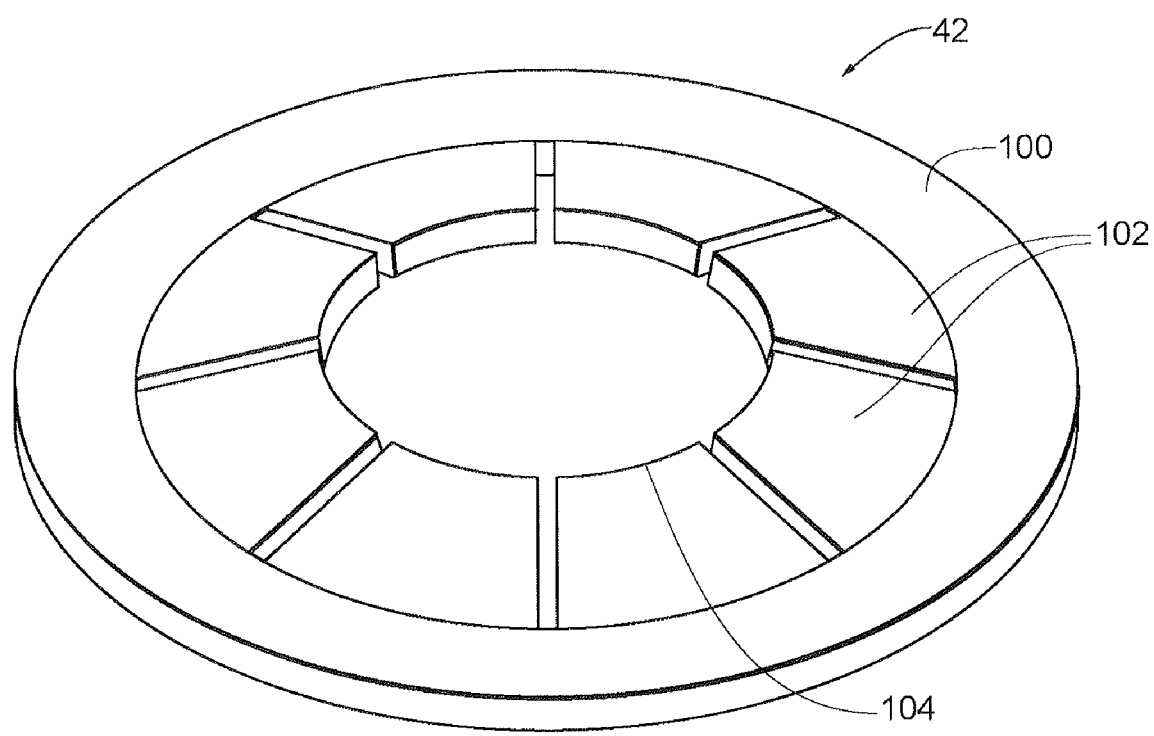
FIG. 12A is a perspective view of a retainer of the bracket assembly of FIG. 3.

Referring to FIG. 12A, retainer 42 generally includes planar portion 100 and a plurality of flexible tabs, or fingers, 102 extending into aperture 104. Aperture 104 generally corresponds to a substantially central portion of retainer 42. Tabs 102 may correspond to geometric FIG. 88 on end portion 86 of post 80 of driver actuator 44, as depicted in FIGS. 8 and 9. Retainer 42 may further include lobes 101 corresponding to grooves 77 when retainer 42 is assembled with brace member 34.

Assembly bracket 30 may be assembled in any number of ways without departing from the spirit or scope of the present invention. According to an embodiment, bracket assembly 30 can be assembled by positioning gears 89 onto drivers 60 of brace member 34. Gears 89 can then be rotated such that threads 98 of gears 89 engage threads 62 of drivers 60. Drivers 60 of brace member 34 with rotators 38 thereon can then be inserted into top and bottom apertures 55', from an inside, included in second channel 54 of body 46 of bracket sleeve 32. Post 80 of driver actuator 44 can be inserted through spring 46 and through central aperture 55" of bracket sleeve 32 until gear teeth 92 of rotators 38 are engaged with pinion teeth 84 of driver 44 and end portion 86 of post 80 is through aperture 76 included in brace member 34.

Figure 12B:
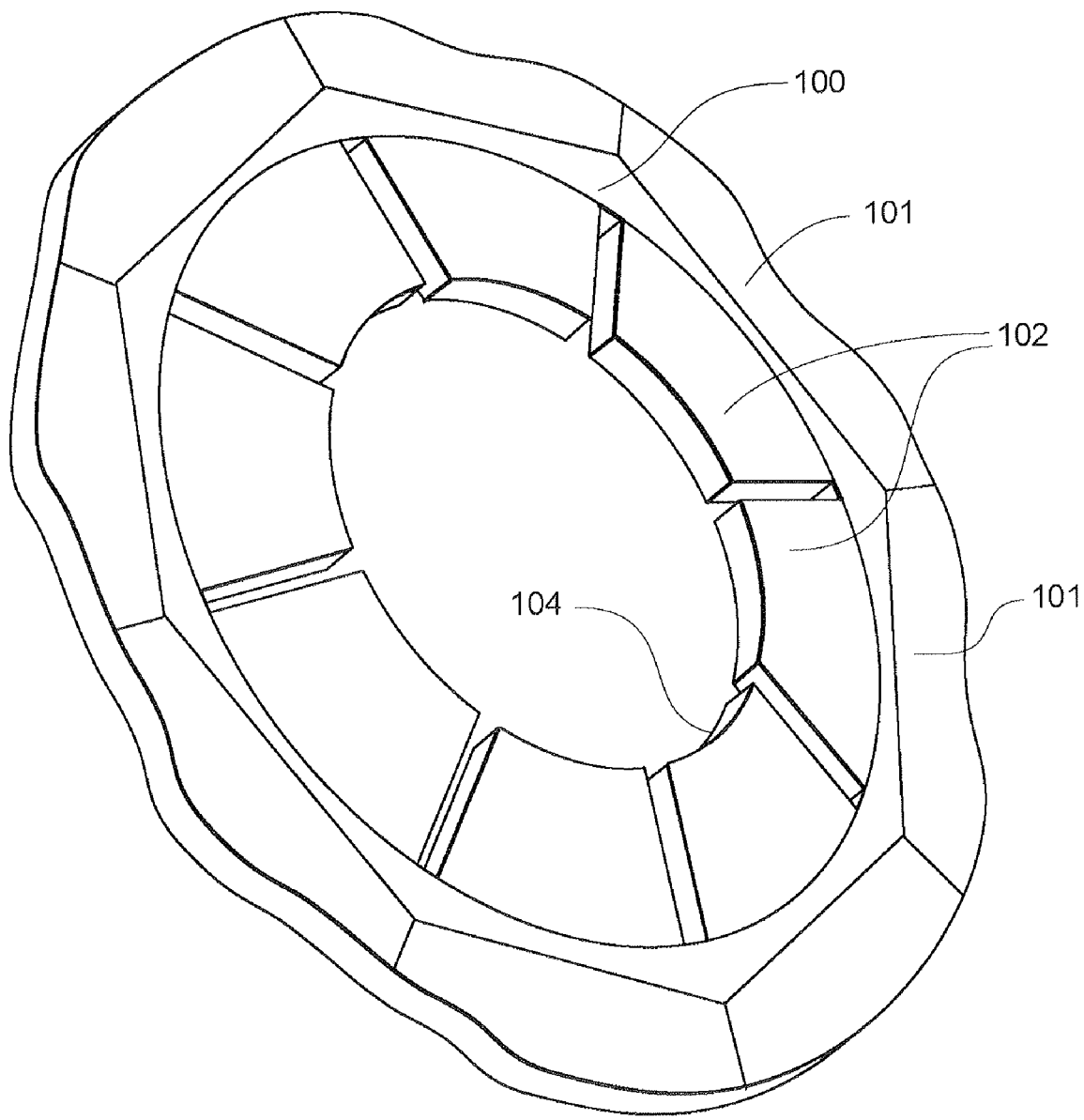
FIG. 12B is a perspective view of the retainer of FIG. 12A, after being deformed to include lobes corresponding with grooves included in a rear cavity of the brace member of FIG. 3.

Retainer 42 can be pressed onto end portion 86 of post 80 of driver actuator 44 and into cavity in rear of brace member 34. Fingers 102 on an inside of retainer 42, such as the eight fingers depicted in FIGS. 12A and 12B according to an embodiment of the present invention, generally self-align with geometric FIG. 88 on end portion 86 of post 80 of brace member 34. This alignment enables retainer 42 to rotate with driver actuator 44. Retainer 42 can further be pressed into grooves 77 in the rear cavity of slider 40 (FIG. 7), such that outer, planar portion 100 of retainer 42 is deformed into lobes 101 corresponding to grooves 77. Deformed retainer 42 is depicted—without slider—in FIG. 12B. Lobes 101 can engage grooves 77 in the rear cavity of slider 40. This engagement generally assists with retention of driver actuator 44 from becoming detached if support member 28 moves around in bracket sleeve 32 during usage.

Referring to FIG. 3, once bracket assembly 30 has been assembled, bracket assembly 30 can be coupled with frame 27 of deck portion 22 on bottom surface of deck portion 26. Apertures 50 included on flanges 48 and also apertures 56 included in first channel 52 can receive fastening members 106 to facilitate coupling of bracket assembly 30 with frame 27 of deck 22 on bottom surface 26 of deck portion 22.

In operation, bracket assembly 30 can be used to detachably couple support member 28 to deck portion 22 of stage section 20. According to an embodiment of the present invention, brace member 34 can be reversibly shifted between a support member engaging position and a support member clearing position. In the support member clearing position, brace member 34 is generally sufficiently retracted within second channel 54 to provide clearance for support member 28 within first channel 52. In the support member engaging position, brace member 34 is generally sufficiently positioned within first and second channels 52, 54 such that, when bracket sleeve 32 has received support member 28, support member engaging surface 61 of brace member pushes against support member 28.

Figure 15:
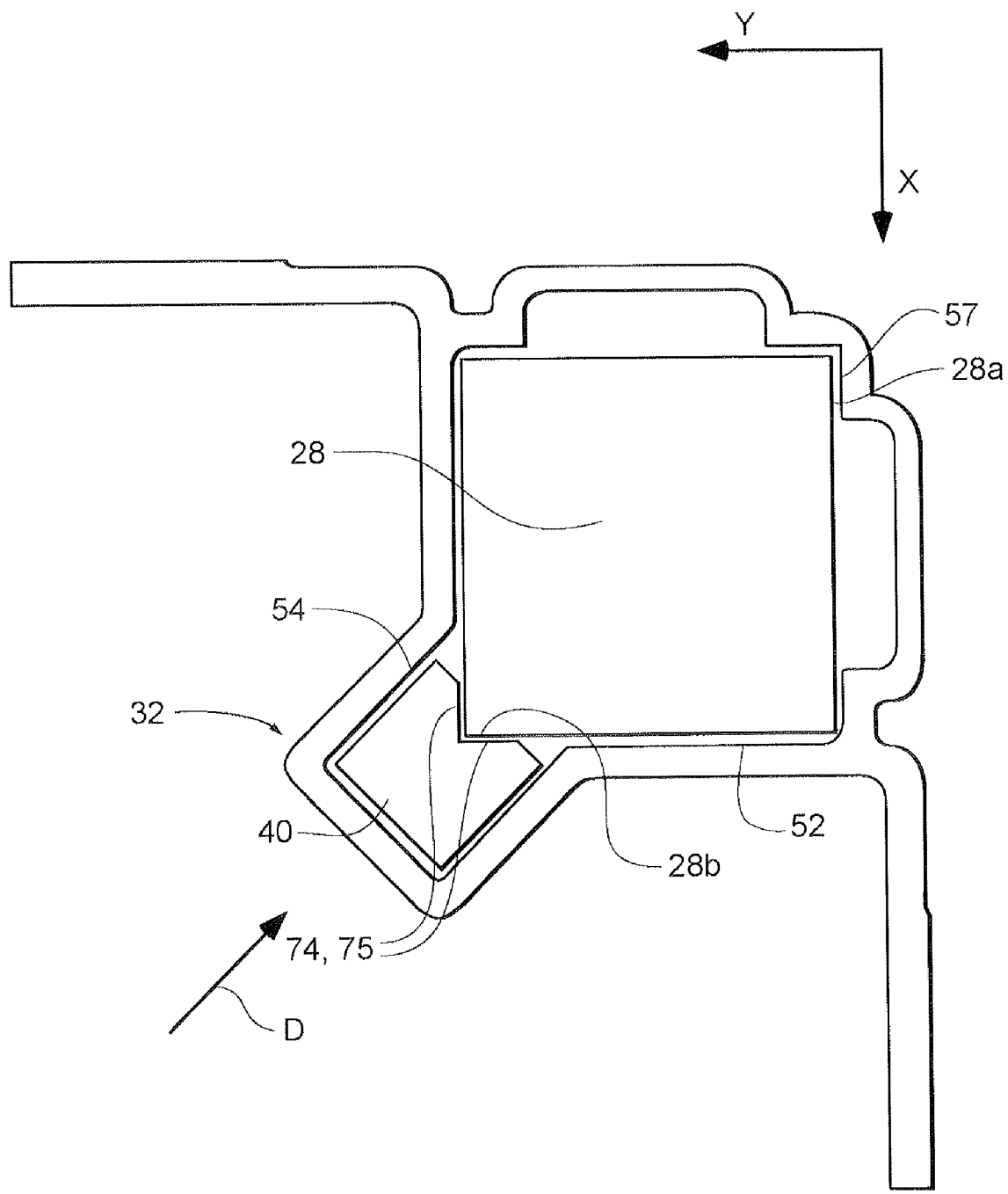
FIG. 15 is a cross-sectional view of a leg and the bracket sleeve of FIG. 5 and the bracket member of FIG. 6.

Referring to FIGS. 3 and 15, a portion of support member 28 can be inserted into first channel 52 of pocket 32 in an embodiment. Support member 28 can be inserted into pocket 32, with a corner 28a of support member 28 in sub-channel 57, until a corner 28b of support member 28 opposite corner 28a of support member 28 in sub-channel 57 comes into contact with inside surface 71 of corner projection 70 on brace member 34. With support member 28 in this position, knob 78 of driver actuator 44 can be turned, such that teeth 84 on pinion portion 82 cause rotators 38 to rotate relative to studs 60 slider 40. Interaction between threads 98 on gears 89 with threads 62 on drivers 60 causes brace member 34 to move inwardly along direction "D" intermediate the x-axis and y-axis towards leg 28 until cutouts 74, 75 come into contact with corner 28b of support member 28, as depicted in FIGS. 3 and 15. Knob 78 can be further turned until a desired tightness of brace member 34 against support member 28 is attained and such that support member 28 is retained in pocket 32. This can be repeated for coupling of multiple support members 28 with deck portion 22, as desired. To selectively detach support member 28 from deck 22, this process can be reversed.

According to an embodiment of the present invention, operation of bracket assembly 30 can be facilitated through a mechanical advantage created by gear mechanism 38. In particular, gears 89 and pinion portion 82 of driver actuator 44 create an advantageous gear ratio. For example, a full revolution of knob 78 and pinion portion 82 may correspond to less than a full revolution of each 89. In an embodiment, the gear ratio of gear 89 to pinion portion 82 is between approximately 1:1 and 3:1. In a further embodiment, the gear ratio of gear 89 to pinion portion 82 is approximately 15:8. One skilled in the art will readily recognize that the respective sizes of gears 89 and pinion portions 82 can be varied to produce corresponding changes in the gear ratio to facilitate movement of brace member 34 between the support member clearing position and the support member engaging position without departing from the spirit or scope of the present invention.

A feature and advantage of the present invention is that drivers 60 can be simultaneously shifted by operation of the driver actuator 44 according to an embodiment. In particular, as knob 78 is rotated, pinion portion 82 is rotated. Rotation of pinion portion 82 can thereby cause gears 89 of gear mechanism 38 to rotate. Since positioning of pinion portion 82 between gears 89 causes gears 89 to be rotated in opposite directions, threading 98 of respective gears 89 may be oppositely configured according to an embodiment of the present invention. To accomplish the same effect, threading 62 of drivers 60 may be oppositely configured according to an alternative embodiment of the same.

With spring 46 exerting a biasing force against knob 78 of driver actuator 44, which is secured to brace member 34 by retain 42, rotation of gears 89 causes drivers 60 to shift main body portion 58. This, in turn, allows brace member 34 to be reversibly shifted between a support member clearing position and a support member engaging position. Support member engaging surface 61 can thereby be pushed against support member 28 to substantially secure support member 28 within bracket sleeve 32. Similarly, support member engaging surface 61 can be removed from support member 28 to substantially release support member 28.

Referring to FIGS. 13 and 14, leg bracket assembly 130 according to a second embodiment that can be used in other locations on deck comprises a bracket sleeve 132 and first and second latch assembly portions 34, 36, which can be as described above with respect to a first embodiment of bracket assembly 30. Referring to FIG. 14, bracket sleeve 132 comprises a body 146 and one or more flanges 148 presented therewith. In this embodiment, flanges 146, 148 can be along a line or at zero degrees relative to one another. Flanges 148 comprise one or more apertures 150. Body 146 comprises a first channel 152 and a second channel 154. First channel 152 comprises one or more apertures 156.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope thereof. Any incorporation by reference of documents above is limited such that no subject matter is incorporated that is contrary to the explicit disclosure herein.

What is claimed is:

1. A bracket assembly for detachably coupling a support member to a platform of a portable stage, the support member presenting a support member longitudinal axis, the bracket assembly comprising:
    a bracket sleeve presenting a bracket sleeve longitudinal axis, the bracket sleeve adapted to receive the support member, with the support member longitudinal axis and bracket sleeve longitudinal axis being generally aligned;
    a brace member shiftably carried by the sleeve and shiftable along a path of travel transverse to the bracket sleeve longitudinal axis between a support member engaging position and a support member clearing position, the brace member including a support member engaging surface and spaced-apart first and second drivers; and
    an actuator assembly for simultaneously shifting the first and second drivers to push the support member engaging surface of the brace member against the support member when the support member is received within the bracket sleeve and the bracket member is in the support member engaging position, wherein the bracket sleeve includes an integral structure circumferentially enclosing an area for receiving the support member and the brace member.

2. The bracket assembly of claim 1, wherein the integral structure includes first and second flanges adapted to be fastened to the platform.

3. The bracket assembly of claim 1, further comprising a gear mechanism for shifting the first and second drivers.

4. The bracket assembly of claim 3, wherein the gear mechanism includes first and second driver gears threadably connected to the first and second drivers, respectively, and an actuator gear coupled to the actuator assembly, the actuator gear engaging the first and second drivers gears.

5. The bracket assembly of claim 4, wherein the actuator assembly includes a reversibly rotatable knob for shifting the brace member between the support member engaging positions and the support member clearing position.

6. The bracket assembly of claim 4, wherein a gear ratio of the first or second driver gear to the actuator gear is between approximately 1:1 and 3:1.

7. The bracket assembly of claim 4, wherein the gear ratio is approximately 15:8.

8. The bracket assembly of claim 1, wherein the support member engaging surface of the brace member is adapted to conformingly engage the support member.

9. The bracket assembly of claim 8, wherein the support member engaging surface of the brace member includes a plurality of spaced-apart cross surfaces.

10. The bracket assembly of claim 1, wherein the bracket sleeve is fixedly coupled to a platform.

11. The bracket assembly of claim 1, wherein a distal end of the actuator assembly defines a faceted surface adapted to conformingly receive a retainer, the retainer substantially resisting decoupling of the actuator assembly and the brace member.

12. The bracket assembly of claim 1, wherein the brace member includes a support member stop for limiting travel of the support member within the bracket sleeve along the bracket sleeve longitudinal axis.

13. A method of assembling a portable stage, the portable stage including a bracket assembly coupled to a platform, the bracket assembly adapted to receive a support member presenting a support member longitudinal axis along a bracket sleeve longitudinal axis of the bracket assembly, the method comprising:
positioning a brace member into a support member clearing position, the brace member having a support member engaging surface and spaced-apart first and second drivers;
inserting a proximal portion of a support member into a bracket sleeve;
substantially aligning the bracket assembly longitudinal axis and the support member longitudinal axis;
simultaneously shifting the first and second drivers;
positioning the brace member into a support member engaging positing by pushing the support member engaging surface of the brace member against the support member;
operating an actuator assembly to rotatably engage a gear mechanism, the gear mechanism including first and second gears, the first gear threadably coupled to the first driver and the second gear threadably coupled to the second driver.

14. The method of claim 13, further comprising:
positioning the brace member into the support member clearing position by retracting the support member engaging surface from the support member; and
removing the support member from the bracket sleeve.

15. The method of claim 13, further comprising:
utilizing a mechanical advantage to position the brace member transverse to the bracket sleeve longitudinal axis.

16. The method of 13, further comprising:
limiting travel of the support member within the bracket sleeve along the bracket sleeve longitudinal axis.

17. A bracket assembly for detachably coupling a support member to a platform of a portable stage, the support member presenting a support member longitudinal axis, the bracket assembly comprising:
a bracket sleeve presenting a bracket sleeve longitudinal axis, the bracket sleeve adapted to receive the support member, with the support member longitudinal axis and bracket sleeve longitudinal axis being generally aligned;
a brace member shiftably carried by the sleeve and shiftable along a path of travel transverse to the bracket sleeve longitudinal axis between a support member engaging position and a support member clearing position, the brace member including a support member engaging surface and spaced-apart first and second drivers;
an actuator assembly for simultaneously shifting the first and second drivers to push the support member engaging surface of the brace member against the support member when the support member is received within the bracket sleeve and the bracket member is in the support member engaging position; and
a gear mechanism for shifting the first and second drivers.

18. The bracket assembly of claim 17, wherein the gear mechanism includes first and second driver gears threadably connected to the first and second drivers, respectively, and an actuator gear coupled to the actuator assembly, the actuator gear engaging the first and second drivers gears.

19. The bracket assembly of claim 18, wherein the actuator assembly includes a reversibly rotatable knob for shifting the brace member between the support member engaging positions and the support member clearing position.

20. The bracket assembly of claim 18, wherein a gear ratio of the first or second driver gear to the actuator gear is between approximately 1:1 and 3:1.

21. The bracket assembly of claim 18, wherein the gear ratio is approximately 15:8.

22. The bracket assembly of claim 17, wherein the gear mechanism creates a mechanical advantage.

23. The bracket assembly of claim 17, wherein the support member engaging surface of the brace member is adapted to conformingly engage the support member.

24. The bracket assembly of claim 23, wherein the support member engaging surface of the brace member includes a plurality of spaced-apart cross surfaces.

25. The bracket assembly of claim 17, wherein the bracket sleeve is fixedly coupled to a platform.

26. The bracket assembly of claim 17, wherein a distal end of the actuator assembly defines a faceted surface adapted to conformingly receive a retainer, the retainer substantially resisting decoupling of the actuator assembly and the brace member.

27. The bracket assembly of claim 17, wherein the brace member includes a support member stop for limiting travel of the support member within the bracket sleeve along the bracket sleeve longitudinal axis.

* * * * *